US012204594B2

(12) United States Patent
Zhao et al.

(10) Patent No.: US 12,204,594 B2
(45) Date of Patent: *Jan. 21, 2025

(54) METHOD AND SYSTEM FOR PROVIDING ALTERNATIVE RESULT FOR AN ONLINE SEARCH PREVIOUSLY WITH NO RESULT

(71) Applicant: TRANSFORM SR BRANDS LLC, Hoffman Estates, IL (US)

(72) Inventors: Rongkai Zhao, Kildeer, IL (US); Zhenyu Lu, Austin, TX (US); Kenneth Katschke, Schaumburg, IL (US)

(73) Assignee: TRANSFORM SR BRANDS LLC, Hoffman Estates, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/502,337

(22) Filed: Nov. 6, 2023

(65) Prior Publication Data

US 2024/0070209 A1 Feb. 29, 2024

Related U.S. Application Data

(63) Continuation of application No. 18/102,017, filed on Jan. 26, 2023, now Pat. No. 11,860,955, which is a continuation of application No. 17/088,273, filed on Nov. 3, 2020, now Pat. No. 11,599,586, which is a continuation of application No. 16/385,410, filed on Apr. 16, 2019, now Pat. No. 10,860,666, which is a continuation of application No. 14/034,875, filed on Sep. 24, 2013, now Pat. No. 10,262,063.

(51) Int. Cl.
*G06F 16/951* (2019.01)
*G06Q 30/00* (2023.01)

(52) U.S. Cl.
CPC ......... *G06F 16/951* (2019.01); *G06Q 30/00* (2013.01)

(58) Field of Classification Search
None
See application file for complete search history.

(56) References Cited

U.S. PATENT DOCUMENTS

| | | |
|---|---|---|
| 6,169,986 B1 | 1/2001 | Bowman |
| 7,912,852 B1 | 3/2011 | McElroy |
| 8,239,282 B2 | 8/2012 | Tufiija |
| 8,655,878 B1 | 2/2014 | Kulkarni |
| 8,965,863 B1 | 2/2015 | Kulkarni |
| 9,058,355 B1 | 5/2015 | Kulkarni |
| 10,262,063 B2 | 4/2019 | Zhao |

(Continued)

*Primary Examiner* — Eddy Cheung
(74) *Attorney, Agent, or Firm* — McAndrews, Held & Malloy, Ltd.

(57) ABSTRACT

A computing device hosting a website of a business may be operable to receive a first search input comprising a term submitted via a search bar on the website. Upon performing an internal search for the term with no result, the computing device may output information on the no-result. The computing device may then perform, using one or more external search engines, a search for the term. Search results of the search, performed using the external search engine(s), may be analyzed. Based on a result of the analysis, one or more particular character strings related to the term may be identified. The computing device may generate and store, based on the identifying of the particular character string(s), one or more alternative search suggestions. Upon subsequently receiving an input comprising at least a portion of the term entered in the search bar, the computing device may output the alternative search suggestion(s).

20 Claims, 7 Drawing Sheets

(56) References Cited

U.S. PATENT DOCUMENTS

| | | |
|---|---|---|
| 2005/0198014 A1 | 9/2005 | De Lury |
| 2005/0257148 A1 | 11/2005 | Goodman |
| 2008/0294624 A1 | 11/2008 | Kanigsberg |
| 2009/0019008 A1 | 1/2009 | Moore |
| 2009/0094221 A1 | 4/2009 | Cameron |
| 2010/0228714 A1 | 9/2010 | Carroll |
| 2012/0036123 A1 | 2/2012 | Hasan |
| 2012/0159294 A1 | 6/2012 | Gonsalves |
| 2013/0179468 A1 | 7/2013 | Westphal |
| 2014/0330841 A1 | 11/2014 | Barrett |
| 2015/0012527 A1 | 1/2015 | Hewitt |
| 2015/0254344 A1 | 9/2015 | Kulkarni |

METHOD AND SYSTEM FOR PROVIDING ALTERNATIVE RESULT FOR AN ONLINE SEARCH PREVIOUSLY WITH NO RESULT

CROSS-REFERENCE TO RELATED APPLICATIONS/INCORPORATION BY REFERENCE

The present application is a continuation of U.S. application Ser. No. 18/102,017 filed Jan. 26, 2023, which is a continuation of U.S. application Ser. No. 17/088,273 filed Nov. 3, 2020 (U.S. Pat. No. 11,599,586), which is a continuation of U.S. application Ser. No. 16/385,410 filed Apr. 16, 2019 (U.S. Pat. No. 10,860,666), which is a continuation of U.S. application Ser. No. 14/034,875 filed Sep. 24, 2013 (U.S. Pat. No. 10,262,063).

FIELD OF THE DISCLOSURE

Certain embodiments of the disclosure relate to online query for an item. More specifically, certain embodiments of the disclosure relate to a method and system for providing alternative result for an online search previously with no result.

BACKGROUND OF THE DISCLOSURE

Consumers often do online searches or queries via a website of a retailer or business for a product or a part of some apparatus. For example, a consumer or customer may type in a model number or a part number as a keyword in a search bar on the website. In instances when there is no match for the search, the customer may receive, in return, information or a message indicating "no result" for the search. Conventionally, if the same customer or some other customer searches for the same model number or the same part number at some other time later, he/she will still receive the message indicating "no result" for the search.

Further limitations and disadvantages of conventional and traditional approaches will become apparent to one of skill in the art, through comparison of such systems with the present disclosure as set forth in the remainder of the present application with reference to the drawings.

BRIEF SUMMARY OF THE DISCLOSURE

A system and/or method for providing alternative result for an online search previously with no result, substantially as shown in and/or described in connection with at least one of the figures, as set forth more completely in the claims.

Various advantages, aspects and novel features of the present disclosure, as well as details of an illustrated embodiment thereof, will be more fully understood from the following description and drawings.

DETAILED DESCRIPTION OF THE DISCLOSURE

Figure 1:
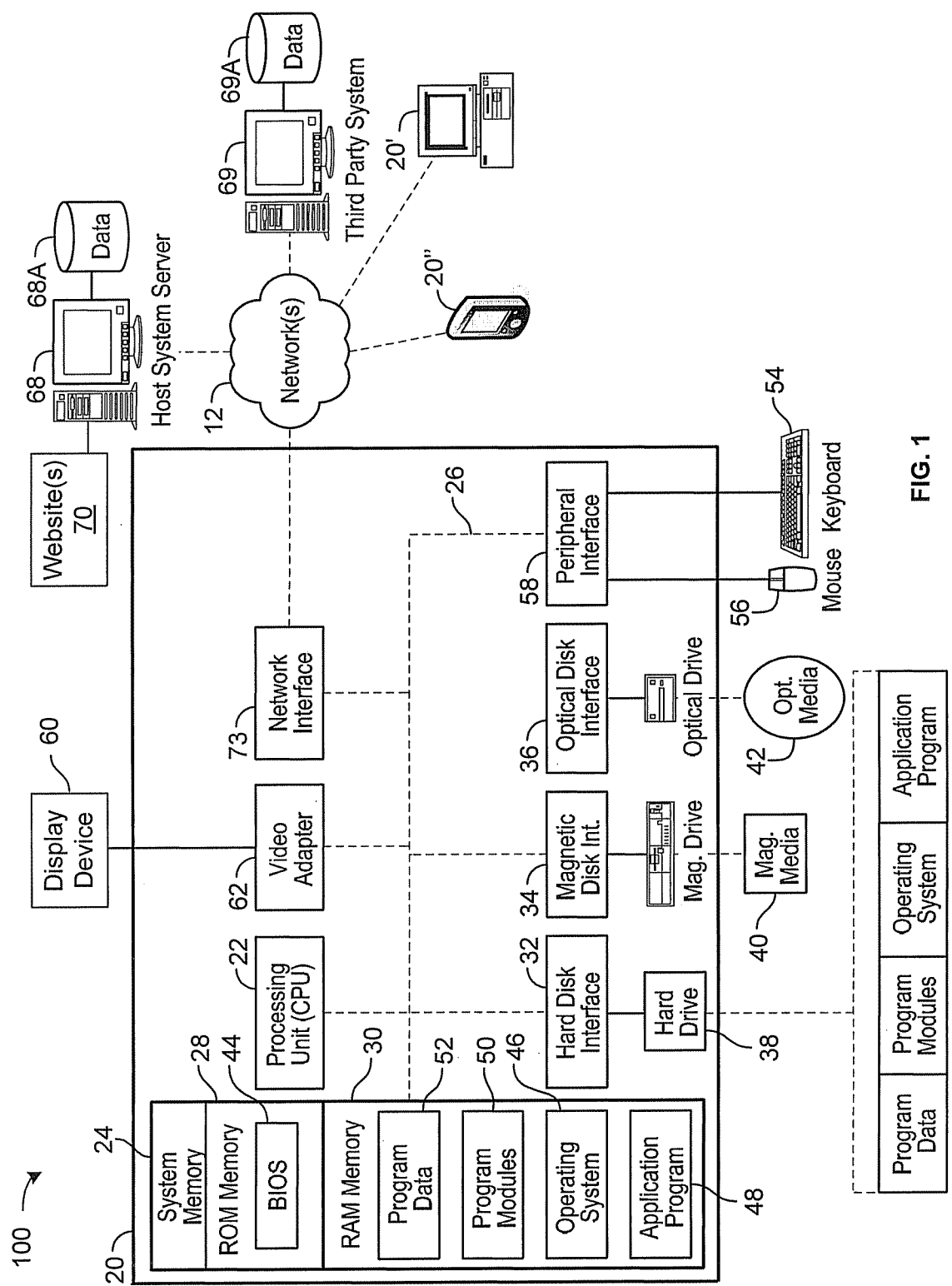
FIG. 1 is a block diagram illustrating an example computer network environment for providing alternative result for an online search previously with no result, in accordance with an example embodiment of the disclosure.

As utilized herein the terms "circuit" and "circuitry" refer to physical electronic components (i.e. hardware) and any software and/or firmware ("code") which may configure the hardware, be executed by the hardware, and/or otherwise be associated with the hardware. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g.," and "for example" set off lists of one or more non-limiting examples, instances, or illustrations. As utilized herein, a device/module/circuitry/etc. is "operable" to perform a function whenever the device/module/circuitry/etc. comprises the necessary hardware and code (if any is necessary) to perform the function, regardless of whether performance of the function is disabled, or not enabled, by some user-configurable setting.

Certain embodiments of the disclosure can be found in a method and system for providing alternative result for an online search previously with no result. In various embodiments of the disclosure, a computing device (e.g., a host system server) hosting a website of a business may be operable to receive a first search input comprising a term which is submitted via a search bar on the website. Upon performing a search, internal to the business, for the received term with no result, the computing device may be operable to output information on the no-result of the search. The computing device may then be operable to perform, using one or more search engines external to the business, a search for the term. Search results of the search, performed using the one or more search engines external to the business, may be analyzed by the computing device. Based on a result of the analysis, one or more particular character strings related to the term may be identified by the computing device. The computing device may be operable to generate and store, based on the identifying of the one or more particular character strings, one or more alternative search suggestions. In this regard, each of the one or more alternative search suggestions will result in information on an item carried by the business. Upon subsequently receiving an input comprising at least a portion of the term entered in the search bar on the website, the computing device may be operable to output the one or more alternative search suggestions for alternative search consideration.

In an example embodiment of the disclosure, the computing device may be operable to receive, after the outputting of the one or more alternative search suggestions, a second search input comprising the term which is submitted via the search bar on the website. In such instances, information on a search result according to one of the one or more alternative search suggestions may be outputted by the computing device.

In an example embodiment of the disclosure, the term may comprise a string of alphanumeric characters, and the term may be determined, by the computing device, as a valid term for search if the string of alphanumeric characters comprises at least one digit. In this regard, for example, the valid term may be normalized, by the computing device, in compliance with a model number or a part number for searching for a model or a part of a product.

In an example embodiment of the disclosure, the computing device may be operable to perform, utilizing one or more methods in natural language processing (NLP), one or more of the analyzing, the identifying and the generating. In this regard, a score may be assigned, by the computing device, to each of a plurality of character strings identified during the analyzing of the search results, and the one or more particular character strings may be identified, by the computing device, based on the assigned scores.

In an example embodiment of the disclosure, the generating of the one or more alternative search suggestions may comprise selecting each of the one or more alternative search suggestions based on that a characteristic of each of the one or more alternative search suggestions matches a predetermined characteristic condition. In this regard, the predetermined characteristic condition may, for example, comprise: (1) the number of the particular character strings in each of the one or more alternative search suggestions being greater than a certain threshold and (2) each of the one or more alternative search suggestions comprising a brand name. In another example embodiment of the disclosure, the generated one or more alternative search suggestions may be stored, by the computing device, in a form of autofill index.

FIG. 1 is a block diagram illustrating an example computer network environment for providing alternative result for an online search previously with no result, in accordance with an example embodiment of the disclosure. Referring to FIG. 1, there is shown a computer network environment 100. In the computer network environment 100, a processing device 20", illustrated in an example form of a mobile communication device, a processing device 20' illustrated in an example form of a computer system, and a processing device 20 illustrated in an example schematic form are shown.

Each of these processing devices 20, 20', 20" are provided with executable instructions to, for example, provide a means for a user to access (among other things) a host system server 68 which may comprise one or more host organization websites 70. In this regard, the host system server 68 may be associated with a retailer or business and a hosted organization website 70 may be a public website (e.g., an online retail environment or online retail store) of the retailer or business. In some instances, a user may be an employee of the retailer or business such as, for example, a network administrator, a sales associate, a customer service agent, or other individual who provides product and/or sales related assistance to customers of the retailer or business. In this regard, the executable instructions may also provide a means for the user (the employee) to be connected to, for example, a product database, an organization's intranet, a supplier database, a website development environment, etc. In some other instances, a user may be a customer or consumer of the retailer or business. In this regard, the executable instructions may also provide a means for the user (the customer) to be connected to, for example, a hosted social networking site, a user profile, a store directory, a sales associate, a customer service agent, etc.

Generally, the computer executable instructions reside in program modules which may include routines, programs, objects, components, data structures, etc. that perform particular tasks or implement particular abstract data types. Accordingly, the processing devices 20, 20', 20" illustrated in FIG. 1 may be embodied in any device having the ability to execute instructions such as, by way of example, a personal computer, mainframe computer, personal-digital assistant ("PDA"), mobile phone, tablet, e-reader, smart phone, or the like. Furthermore, while described and illustrated in the context of a single processing device 20, 20', 20", the various tasks described hereinafter may be practiced in a distributed environment having multiple processing devices linked via a local or wide-area network whereby the executable instructions may be associated with and/or executed by one or more of multiple processing devices.

For performing the various tasks in accordance with the executable instructions, the example processing device 20 includes a processing unit (processor) 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer-readable instructions, data structures, program modules and other data for the processing device 20. Other types of non-transitory computer-readable media that can store data and/or instructions may be used for this same purpose. Examples of such media devices include, but are not limited to, magnetic cassettes, flash memory cards, digital video-disks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser), other program modules 50, and/or program data 52. Still further, computer-executable instructions may be downloaded to one or more of the processing devices 20, 20', 20" as needed, for example via a network connection.

To allow a user to enter commands and information into the processing device 20, input devices such as a keyboard 54 and/or a pointing device (e.g., a mouse) 56 are provided. While not illustrated, other input devices may include a microphone, a joystick, a game pad, a scanner, a camera, touchpad, touch screen, etc. These and other input devices are typically connected to the processing unit (processor) 22 by means of a peripheral interface 58 which, in turn, is coupled to the bus 26. Input devices may be connected to the processor 22 using interfaces such as, for example, a parallel port, game port, FireWire, or a universal serial bus (USB). To view information from the processing device 20, a display device 60 may also be connected to the bus 26 via an interface, such as a video adapter 62. The display device 60 may be, for example a coupled monitor, an integrated display module, or other suitable type of display device. The display device 60 may comprise, for example, a presence-sensitive screen such as a touchscreen or touch-sensitive screen. In addition to the display device 60, the processing device 20 may also include other peripheral output devices (not shown), such as, for example, speakers, cameras, printers, or other suitable device.

As noted, the processing device 20 may also utilize logical connections to one or more remote processing devices, such as the host system server 68 having associated data repository 68A. In this regard, while the host system server 68 has been illustrated in the exemplary form of a computer, the host system server 68 may, like processing device 20, be any type of device having processing capabilities. Again, the host system server 68 need not be implemented as a single device but may be implemented in a manner such that the tasks performed by the host system server 68 are distributed amongst a plurality of processing devices/databases located at different geographical locations and linked through a communication network. Additionally, the host system server 68 may have logical connections to other third party systems (e.g., a third party system 69) via a network 12, such as, for example, the Internet, LAN, MAN, WAN, cellular network, cloud network, enterprise network, virtual private network, wired and/or wireless network, or other suitable network, and via such connections, will be associated with data repositories (e.g., a data repository 69A) that are associated with such other third party systems. Such third party systems may include, without limitation, systems of banking, credit, or other financial institutions, systems of third party providers of goods and/or services, systems of shipping/delivery companies, media content providers, document storage systems, etc.

For performing tasks as needed, the host system server 68 may include many or all of the elements described above relative to the processing device 20. For example, the host system server 68 may be operable to implement an online retail channel of the retailer or business. In this regard, one or more online stores of the retailer or business may allow customers to shop for items and/or services sold by the retailer or business using one or more websites 70 of the retailer or business. In addition, the host system server 68 would generally include executable instructions for, among other things, performing various tasks in accordance with various example embodiments of the present disclosure.

Communications between the processing device 20 and the host system server 68 may be exchanged via a further processing device, such as a network router (not shown), that is responsible for network routing. Communications with the network router may be performed via a network interface component 73. Thus, within such a networked environment, e.g., the Internet, World Wide Web, LAN, cloud, or other like type of wired or wireless network, program modules depicted relative to the processing device 20, or portions thereof, may be stored in the non-transitory computer-readable memory storage device(s) of the host system server 68.

In operation, a computing device such as the host system server 68 hosting the website 70 of the retailer or business may be operable to receive a first search input comprising a term (or a token) which is submitted via a search bar on the website 70. In this regard, the first search input may be received from a user device, such as the processing device 20 associated with a customer, via the network 12, for example. Upon performing a search, internal to the business, for the received term with no result, the computing device may be operable to output information on the no-result of the search to the user device (e.g., the processing device 20) via the network 12, for example. The computing device may then be operable to perform, using one or more search engines external to the business, a search for the term. Search results of the search, performed using the one or more search engines external to the business, may be analyzed by the computing device. Based on a result of the analysis, one or more particular character strings related to the term may be identified by the computing device. The computing device may be operable to generate and store, based on the identifying of the one or more particular character strings, one or more alternative search suggestions. In this regard, each of the one or more alternative search suggestions will result in information on an item (e.g., a product) carried by the business.

Upon subsequently receiving an input comprising at least a portion of the term entered in the search bar on the website 70, the computing device may be operable to output the one or more alternative search suggestions for alternative search consideration. In this regard, the input, which comprises at least a portion of the term entered in the search bar, may be received subsequently from a different user device (e.g., the processing device 20') associated with a different customer or even from the user device (e.g., the processing device 20) associated with the same customer.

Figure 2A:
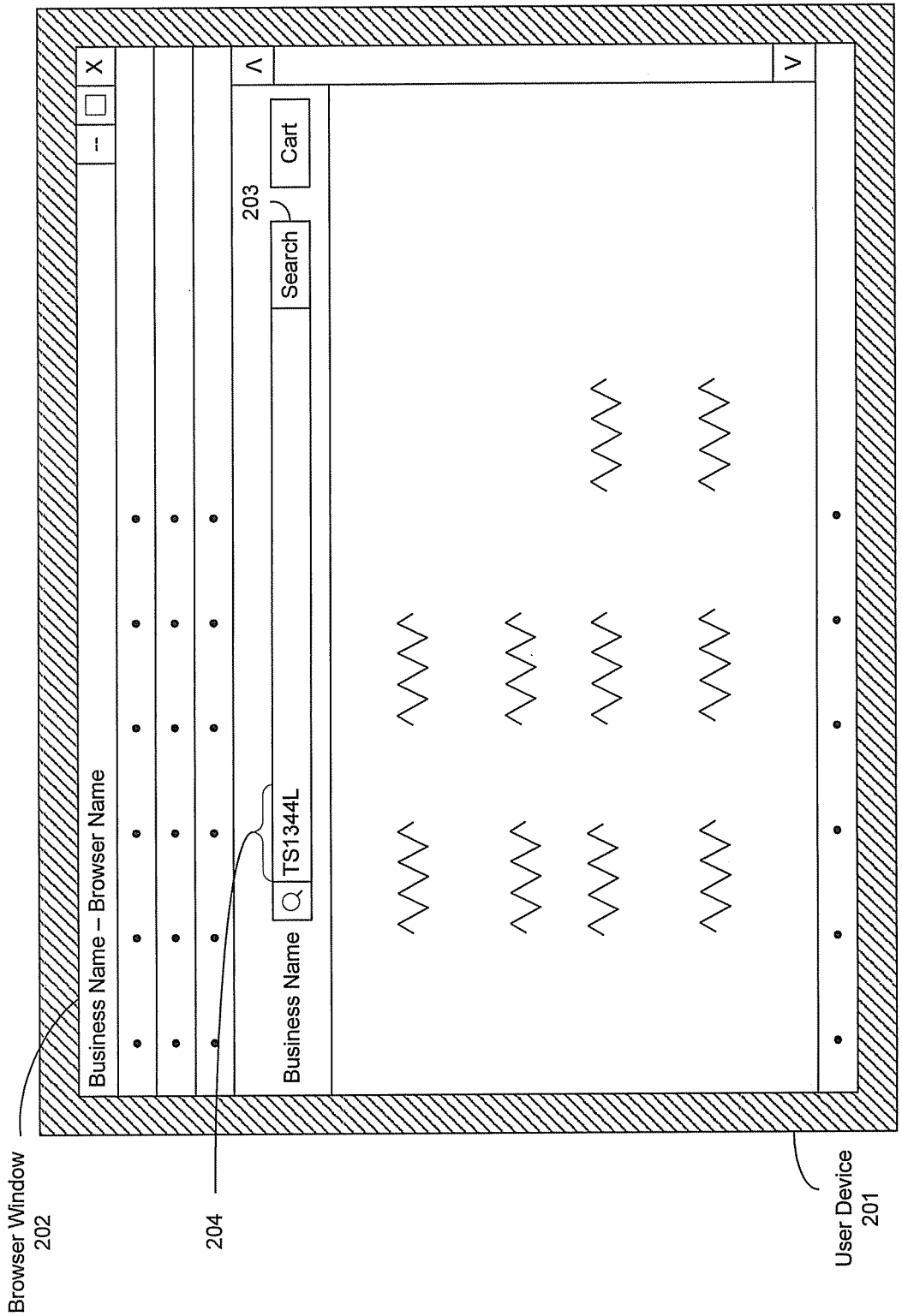
FIGS. 2A-2E are each a block diagram that illustrates an example browser window displaying a webpage with a search bar, in accordance with an example embodiment of the disclosure.
Figure 2B:
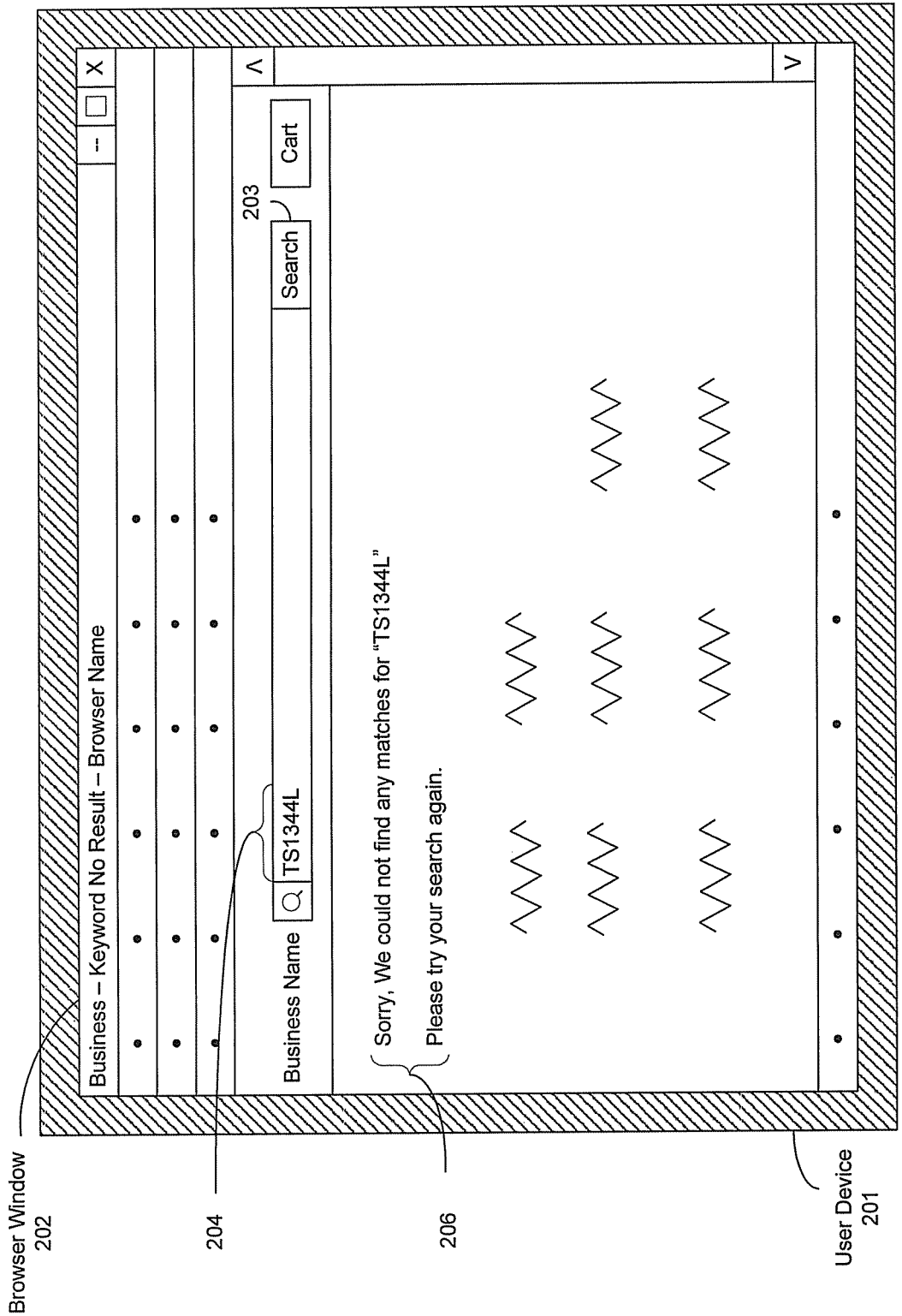
Figure 2C:
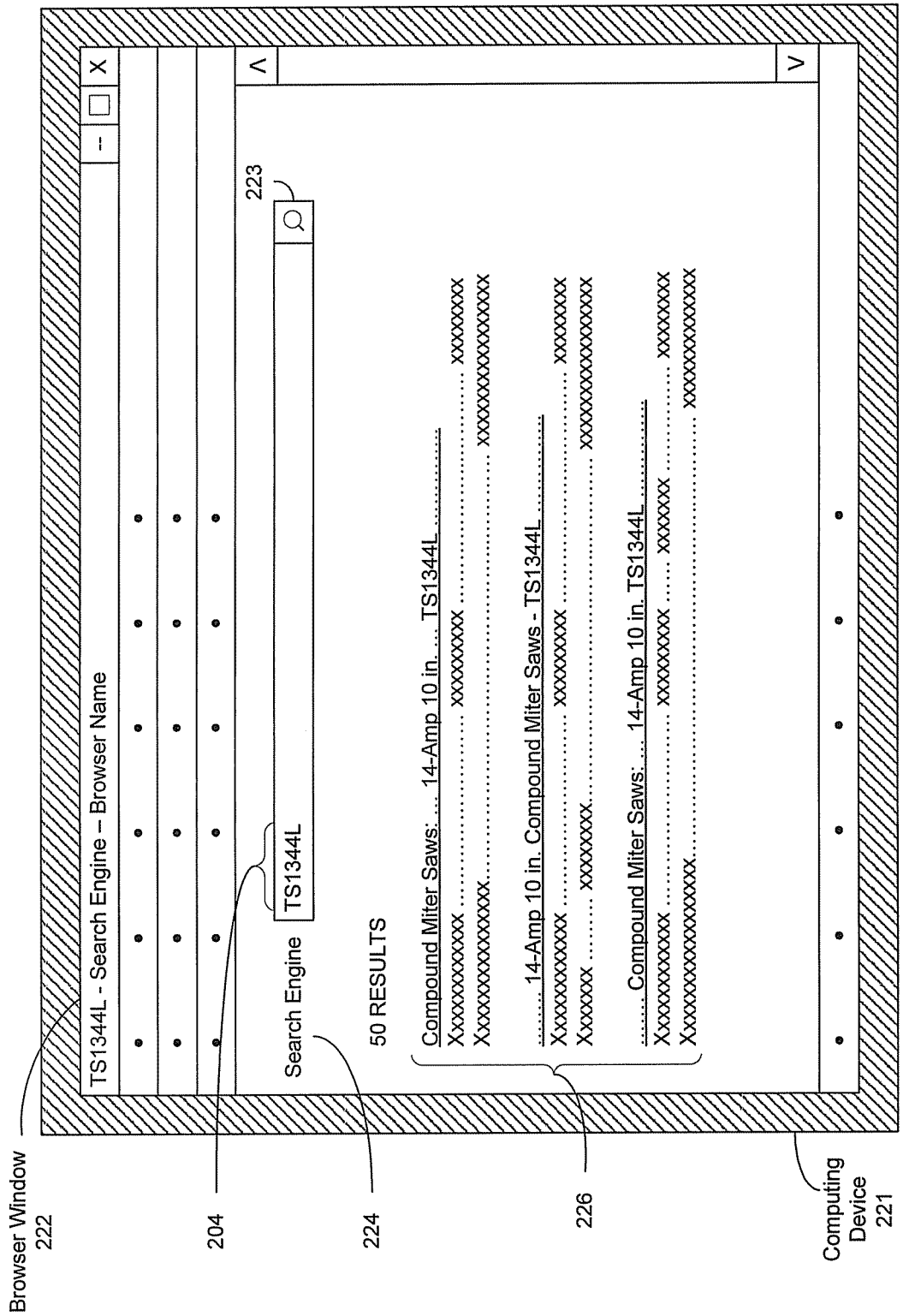

FIGS. 2A-2E are each a block diagram that illustrates an example browser window displaying a webpage with a search bar, in accordance with an example embodiment of the disclosure. Referring to FIGS. 2A-2B, 2D-2E, there is shown a user device 201 which presents a browser window 202. The browser window 202 may display a webpage of the website 70. The webpage of the website 70 may comprise a search bar 203. The user device 201 may be substantially similar to the processing device 20 (or 20', 20") described with respect to FIG. 1, for example. Referring to FIG. 2C, there is shown a computing device 221 which presents a browser window 222. The browser window 222 may display a webpage of a search engine external to the business (described with respect to FIG. 1), and the webpage of the search engine may comprise a search bar 223. The computing device 221 may be substantially similar to the host system server 68 described with respect to FIG. 1, for example.

Referring now to FIGS. 2A-2B. In an example operation, the computing device 221 may be operable to receive a first search input comprising a term 204 which is submitted via the search bar 203 on the webpage of the website 70 presented by the user device 201. Upon performing a search, internal to the business, for the received term 204 with no result (i.e., without a match), the computing device 221 may be operable to output information 206 on the no-result of the search, to the user device 201 as shown in FIG. 2B.

Referring now to FIG. 2C. In an example operation, after presenting the information 206 on no-result of the search to the user device 201, the computing device 221 may be operable to perform, using a search engine 224 external to the business, a general search for the term 204. In this regard, the computer device 221 may first be operable to verify and determine that the term 204 is a valid term which comprises a single string of alphanumeric characters with at least one digit. The term 204 may be further normalized (e.g., trimming, case-conversion, etc.), by the computing device 221, in compliance with a model number or a part number for targeting search for a model or a part of a product.

The computing device 221 may be operable to analyze search results 226 of the search performed using the external search engine 224. The computing device 221 may be operable to identify, based on a result of the analysis, one or more particular character strings related to the term 204. Based on the identifying of the one or more particular character strings, one or more alternative search suggestions 208 (shown in FIG. 2D) may be generated by the computing device 221. For example, as shown in FIG. 2C, the term 204 may comprise an alphanumeric character string "TS1344L". In such instances, the identified particular character strings related to and/or relevant to the term "TS1344L" may comprise, for example, "Compound", "Miter", "Saws", "14-Amp", "10", "in.". In this regard, the computing device 221 may perform one or more of the analyzing, the identifying and the generating, utilizing, for example, one or more methods in natural language processing (NLP). The natural language processing (NLP) may enable the computing device 221 to perform, for example, keyword extraction based on a semantic analysis of a sentence. The one or more NLP methods (or tasks) used for analyzing and/or identifying may comprise part-of-speech (POS), term-position and/or term-dependency, for example. The one or more alternative search suggestions 208 (shown in FIG. 2D) may be generated utilizing the method of information-retrieval (IR) in NLP, for example.

During the analyzing of the search results 226, the computing device 211 may be operable to assign a score to each of a plurality of identified character strings. In this regard, the one or more particular character strings may be selected and/or identified, by the computing device 221, based on the assigned scores. For example, a character string with a high score (e.g., a noun term based on the POS) may be considered as an important keyword and may be selected as one of the particular character strings. For example, a character string which belongs to the subject of a sentence and is also the last word of the subject phrase may be considered more important and hence may be scored higher. For example, in a phrase "XYZ 14-Amp 10 in. Compound Miter Saws", "Saws", "Compound", "Miter" may be considered as keywords, and "XYZ", "14-Amp", "10 in." may be considered as attribute words. Inside of "10 in.", "10" is the numeric value and "in." is the unit. Based on analyzing of those linguistic details, different scores may be assigned to those character strings accordingly.

The generating of the one or more alternative search suggestions 208 (shown in FIG. 2D) may further comprise selecting each of the one or more alternative search suggestions 208 based on that a characteristic of each of the one or more alternative search suggestions 208 matches a predetermined characteristic condition. In this regard, for example, the predetermined characteristic condition may comprise: (1) the number of the particular character strings in each of the one or more alternative search suggestions 208 being greater than a certain threshold and (2) each of the one or more alternative search suggestions 208 comprising a brand name.

The generated one or more alternative search suggestions 208 (shown in FIG. 2D) may be stored, by the computing device 221 for use in future or subsequent search request(s) from a user device such as the user device 201, for example. In this regard, the computing device 221 may be operable to store the generated one or more alternative search suggestions 208 in a form of autofill index, for example, for fetching candidate search phrases.

Figure 2D:
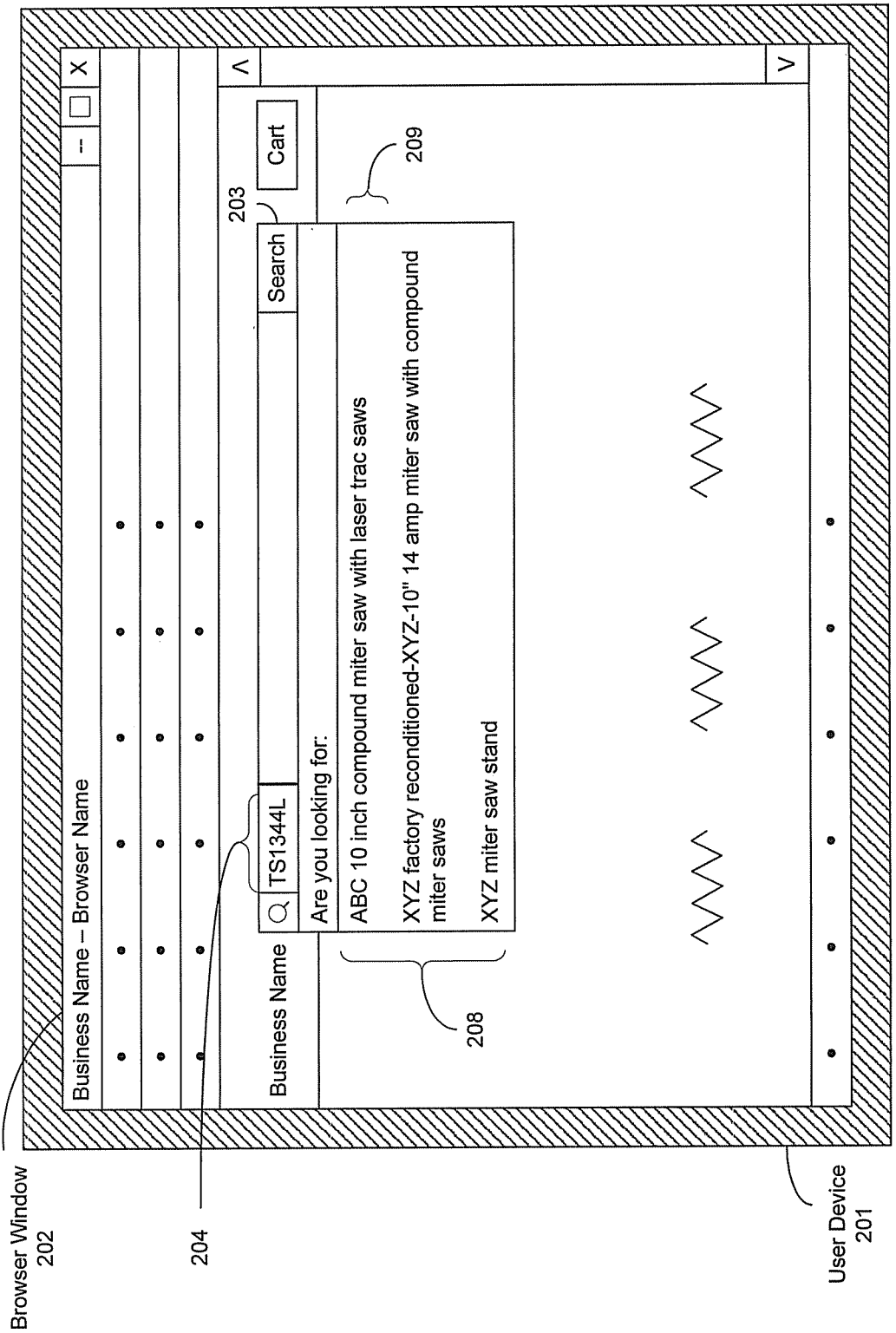
Figure 2E:
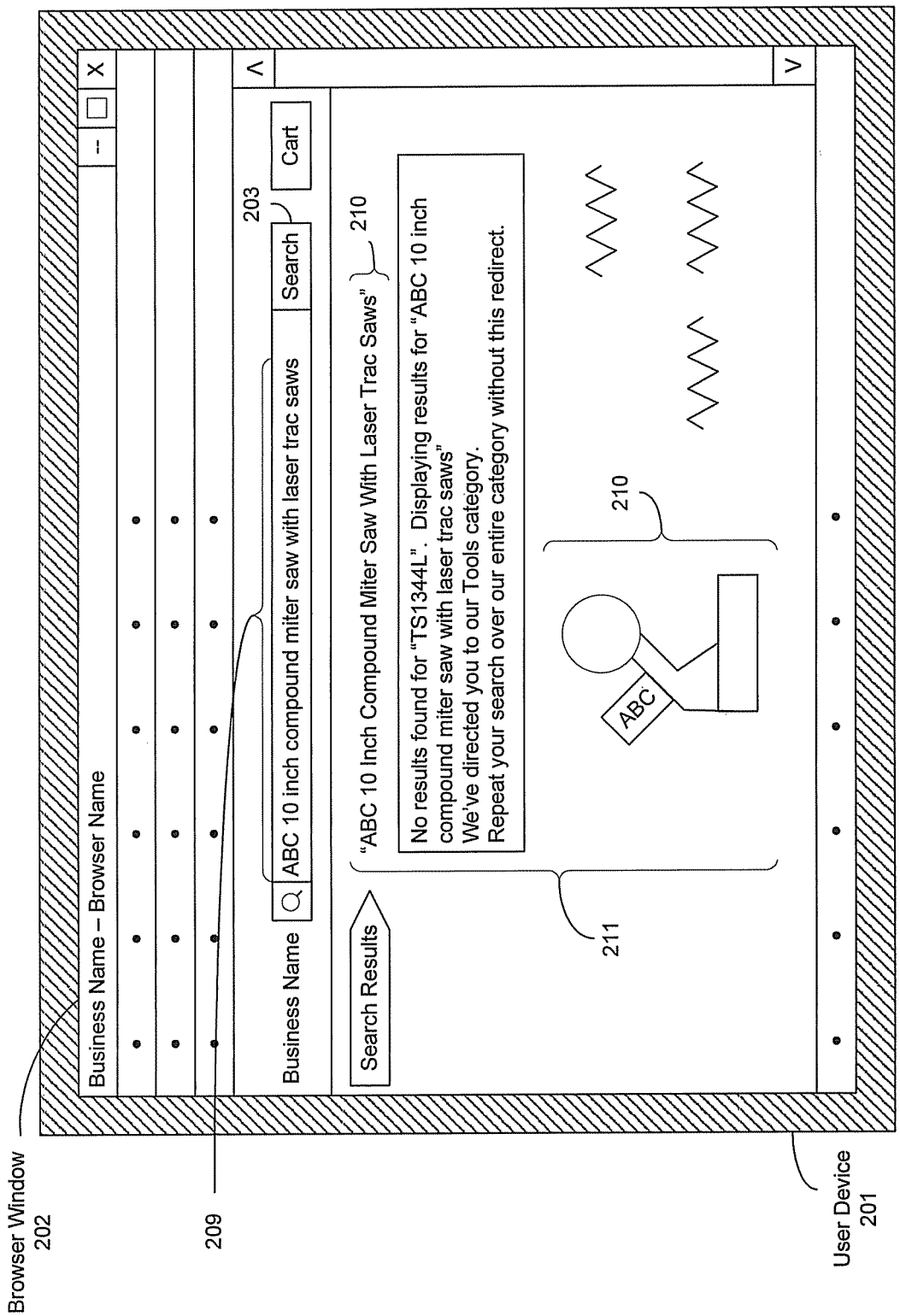

Referring now to FIGS. 2D-2E. In an example operation, upon subsequently (e.g., one hour after receiving of the first search input) receiving an input comprising at least a portion of the term 204 entered in the search bar 203 on the webpage of the website 70, the computing device 221 may be operable to output the one or more alternative search suggestions 208 for alternative search consideration. In instances when a particular search suggestion such as the search suggestion 209 is selected and submitted by the customer via the user device 201, the computing device 221 may be operable to output information 210 on a search result with a match, according to the selected search suggestion 209. However, in some instances, after the outputting of the one or more alternative search suggestions 208 to the user device 201, the customer still submit the term 204, via the user device 201, for the search regardless. In such instances, the computing device 221 may be operable to receive, after the outputting of the one or more alternative search suggestions 208, a second search input comprising the term 204 which is submitted via the search bar 203 on the webpage of the website 70. The computing device 221 may then be operable to output information 211 on a search result according to one of the one or more alternative search suggestions 208 (e.g., according to the search suggestion 209). In this regard, the information 211 may also indicate that no-results were found for the term 204 and results for the search suggestion 209 are displayed instead, for example.

Figure 3:
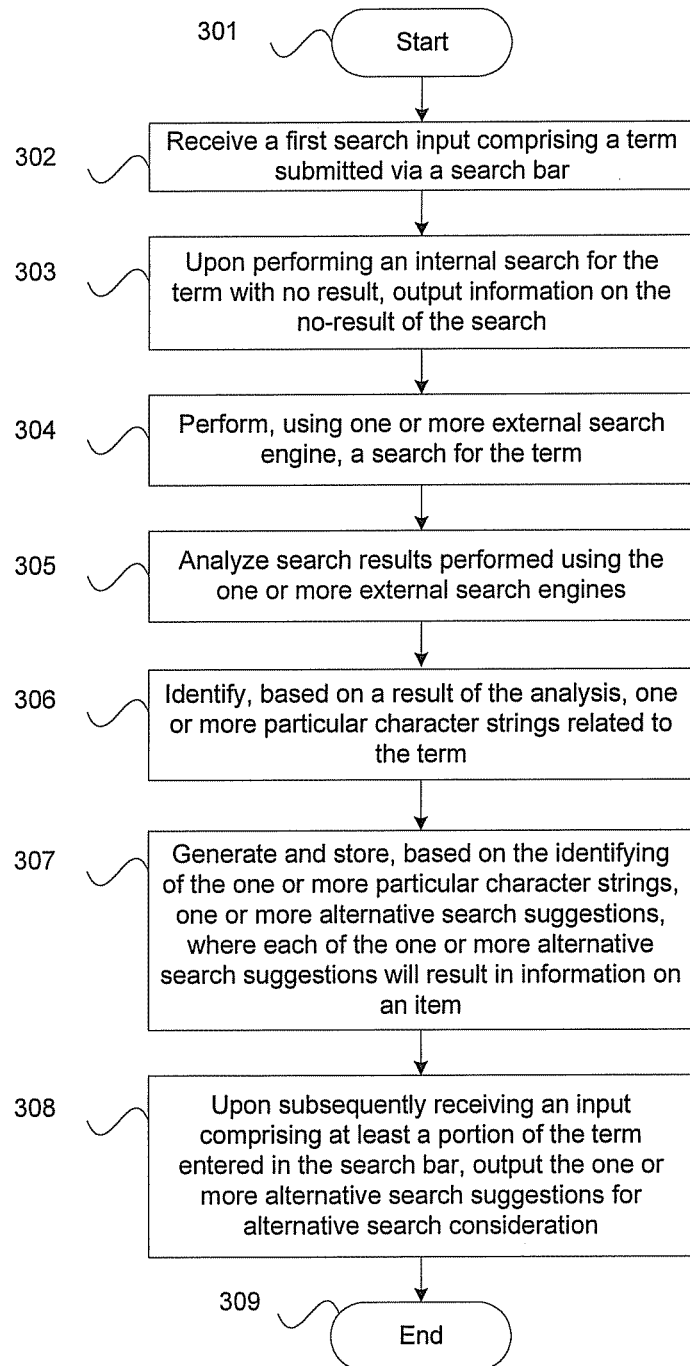
FIG. 3 is a flow chart illustrating example steps for providing alternative result for an online search previously with no result, in accordance with an example embodiment of the disclosure.

FIG. 3 is a flow chart illustrating example steps for providing alternative result for an online search previously with no result, in accordance with an example embodiment of the disclosure. Referring to FIG. 3, the example steps start at step 301. In step 302, the computing device 221 may be operable to receive a first search input comprising a term 204 which is submitted via the search bar 203 on the webpage of the website 70 presented by the user device 201. In step 303, upon performing an internal search (internal to the business) for the received term 204 with no result (i.e., without a match), the computing device 221 may be operable to output information 206 on the no-result of the search, to the user device 201. In step 304, the computing device 221 may be operable to perform, using one or more external search engines such as the search engine 224 (external to the business), a general search for the term 204. In this regard, the computer device 221 may first be operable to verify and determine that the term 204 is a valid term which comprises a single string of alphanumeric characters with at least one digit. The term 204 may be further normalized (e.g., trimming, case-conversion, etc.), by the computing device 221, for targeting search for a model or a part of a product, for example.

In step 305, the computing device 221 may be operable to analyze search results 226 of the search performed using the one or more external search engines such as the search engine 224. The analysis may be performed utilizing, for example, one or more methods in natural language processing (NLP). In step 306, the computing device 221 may be operable to identify, based on a result of the analysis, one or more particular character strings related to the term 204. The identifying may be performed utilizing, for example, one or more methods in natural language processing (NLP). In step 307, the computing device 221 may be operable to generate and store, based on the identifying of the one or more particular character strings, one or more alternative search suggestions 208, where each of the one or more alternative search suggestions 208 will result in information on an item carried or sold by the business. The generating may be performed utilizing, for example, an information-retrieval (IR) method in NLP. In step 308, upon subsequently receiving an input comprising at least a portion of the term 204 entered in the search bar 203 on the webpage of the website 70, the computing device 221 may be operable to output the one or more alternative search suggestions 208 for alternative search consideration. The example steps may proceed to the end step 309.

In various embodiments of the disclosure, a computing device 221 (e.g., a host system server 68) hosting a website 70 of a business may be operable to receive a first search input comprising a term 204 which is submitted via a search bar 203 on the website 70. Upon performing a search, internal to the business, for the received term 204 with no result, the computing device 221 may be operable to output information 206 on the no-result of the search. The computing device 221 may then be operable to perform, using one or more search engines 224 external to the business, a search for the term 204. Search results 226 of the search, performed using the one or more search engines 224 external to the business, may be analyzed by the computing device 221. Based on a result of the analysis, one or more particular character strings related to the term 204 may be identified by the computing device 221. The computing device 221 may be operable to generate and store, based on the identifying of the one or more particular character strings, one or more alternative search suggestions 208. In this regard, each of the one or more alternative search suggestions 208 will result in information on an item carried by the business. Upon subsequently receiving an input comprising at least a portion of the term 204 entered in the search bar 203 on the website 70, the computing device 221 may be operable to output the one or more alternative search suggestions 208 for alternative search consideration.

The computing device 221 may be operable to receive, after the outputting of the one or more alternative search suggestions 208, a second search input comprising the term 204 which is submitted via the search bar 203 on the website 70. In such instances, information 211 on a search result according to one (e.g., a search suggestion 209) of the one or more alternative search suggestions 208 may be outputted by the computing device 221.

The term 204 may comprise a string of alphanumeric characters, and the term 204 may be determined, by the computing device 221, as a valid term for search if the string of alphanumeric characters comprises at least one digit. In this regard, for example, the valid term may be normalized, by the computing device 221, in compliance with a model number or a part number for searching for a model or a part of a product.

The computing device 221 may be operable to perform, utilizing one or more methods in natural language processing (NLP), one or more of the analyzing, the identifying and the generating. In this regard, a score may be assigned, by the computing device 221 to each of a plurality of character strings identified during the analyzing of the search results, and the one or more particular character strings may be identified, by the computing device 221, based on the assigned scores.

The generating of the one or more alternative search suggestions 208 may comprise selecting each of the one or more alternative search suggestions 208 based on that a characteristic of each of the one or more alternative search suggestions 208 matches a predetermined characteristic condition. In this regard, the predetermined characteristic condition may, for example, comprise: (1) the number of the particular character strings in each of the one or more alternative search suggestions 208 being greater than a certain threshold and (2) each of the one or more alternative search suggestions 208 comprising a brand name. The generated one or more alternative search suggestions 208 may be stored, by the computing device 221, in a form of autofill index.

Other embodiments of the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for providing alternative result for an online search previously with no result.

Accordingly, aspects of the present disclosure may be realized in hardware, software, or a combination of hardware and software. The present disclosure may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Aspects of the present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method comprising:
   in a computing device hosting a business website:
   performing an internal search, on the business website, based on a term;
   modifying the term to comprise a model number or a part number, if the internal search receives no result;
   performing an external search, on one or more different websites, based on the modified term; and
   associating an item carried by the business with the term according to a result of the external search.

2. The method according to claim 1, wherein the method comprises outputting one or more alternative search suggestions.

3. The method according to claim 1, wherein the term is associated with a string of alphanumeric characters.

4. The method according to claim 3, wherein the method comprises determining that the term is a valid term for search if the string of alphanumeric characters comprises at least one digit.

5. The method according to claim 4, wherein the method comprises normalizing the determined valid term in compliance with a model number or a part number for searching for a model or a part of a product.

6. The method according to claim 1, wherein the method comprises utilizing natural language processing (NLP).

7. The method according to claim 1, wherein the method comprises:
assigning a score to each of a plurality of character strings identified while analyzing search results; and
identifying the one or more particular character strings based on the assigned scores.

8. The method according to claim 1, wherein the method comprises: generating one or more alternative search suggestions, and
selecting each of the one or more alternative search suggestions based on whether a characteristic of each of the one or more alternative search suggestions matches a predetermined characteristic condition.

9. The method according to claim 8, wherein the predetermined characteristic condition comprises: the number of a particular character strings in each of the one or more alternative search suggestions being greater than a certain threshold; and each of the one or more alternative search suggestions comprising a brand name.

10. The method according to claim 1, comprising storing the one or more alternative search suggestions in a form of autofill index.

11. A system comprising:
one or more processors operable to host a business search engine, wherein the one or more processors are configured to:
perform an internal search, on the business website, based on a term;
modify the term to comprise a model number or a part number, if the internal search receives no result;
perform an external search, on one or more different websites, based on the modified term; and
associate an item carried by the business with the term according to a result of the external search.

12. The system according to claim 11, wherein the one or more processors are configured to output one or more alternative search suggestions.

13. The system according to claim 11, wherein the term comprises a string of alphanumeric characters.

14. The system according to claim 13, wherein the one or more processors are configured to determine that the term is a valid term for search if the string of alphanumeric characters comprises at least one digit.

15. The system according to claim 14, wherein the one or more processors are configured to normalize the determined valid term in compliance with a model number or a part number for searching for a model or a part of a product.

16. The system according to claim 11, wherein the one or more processors are operable to utilize natural language processing (NLP).

17. The system according to claim 11, wherein the one or more processors are configured to:
assign a score to each of a plurality of character strings identified while analyzing search results; and
identify the one or more particular character strings based on the assigned scores.

18. The system according to claim 11, wherein the one or more processors are configured to:
generate one or more alternative search suggestions, and
select each of the one or more alternative search suggestions based on whether a characteristic of each of the one or more alternative search suggestions matches a predetermined characteristic condition.

19. The system according to claim 18, wherein the predetermined characteristic condition comprises:
the number of the particular character strings in each of the one or more alternative search suggestions being greater than a certain threshold; and
each of the one or more alternative search suggestions comprising a brand name.

20. The system according to claim 11, wherein the one or more processors are operable to store one or more alternative search suggestions in a form of autofill index.

* * * * *